No. 895,216. PATENTED AUG. 4, 1908.
C. E. WAGNER.
VEGETABLE SLICER.
APPLICATION FILED JAN. 26, 1907.
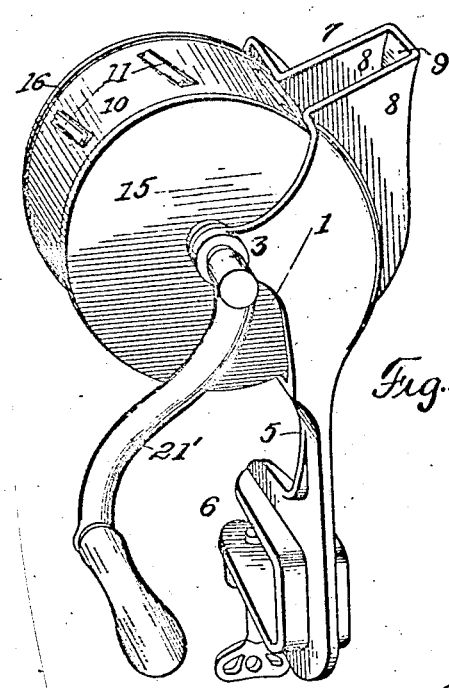
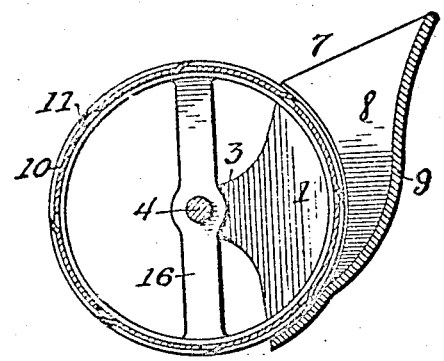
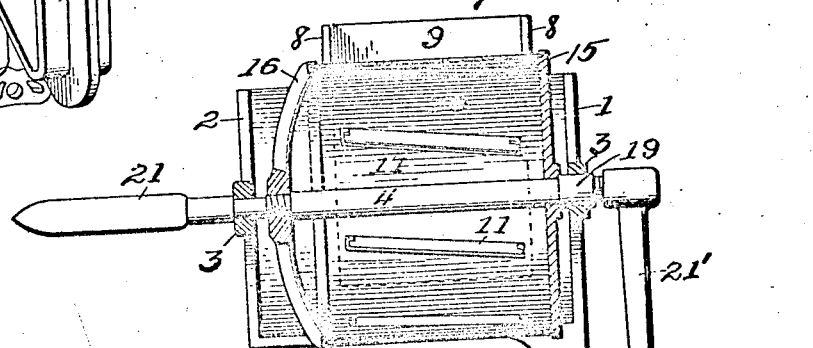
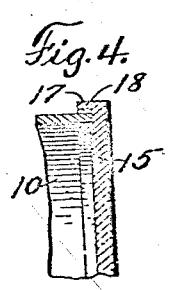
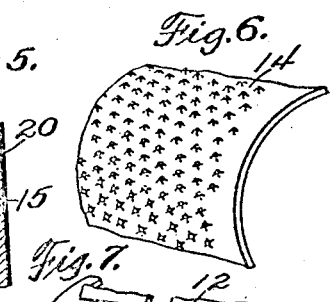
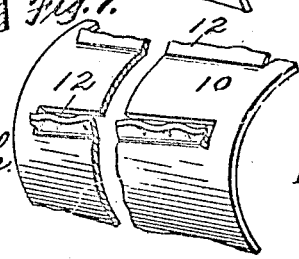
WITNESSES:
INVENTOR
Charles E. Wagner
BY
Attorneys

UNITED STATES PATENT OFFICE.

CHARLES E. WAGNER, OF CEDAR RAPIDS, IOWA.

VEGETABLE-SLICER.

No. 895,216.  Specification of Letters Patent.  Patented Aug. 4, 1908.

Application filed January 26, 1907. Serial No. 354,295.

*To all whom it may concern:*

Be it known that I, CHARLES E. WAGNER, a citizen of the United States of America, residing at Cedar Rapids, in the county of Linn and State of Iowa, have invented certain new and useful Improvements in Vegetable-Slicers, of which the following is a specification, reference being had therein to the accompanying drawing.

This invention relates to certain new and useful improvements in vegetable slicers, and has for its object the provision of a simple machine or device by means of which vegetables, fruits, and other articles of food, may be rapidly and uniformly sliced, or grated as may be desired.

One of the main objects of the present invention is to provide a hopper for the vegetable slicer, adapted to receive the vegetables or other articles of food to be sliced, and so constructed that the vegetables or other articles of food when fed to the hopper, are caught by the slicing knives or other disintegrating elements of the slicer, and as one slice or part of the vegetable or other article is cutaway, the vegetable or article is drawn deeper into the hopper so that the succeeding cutters successively engage with the vegetable or other article, until the latter is completely disintegrated, thus making a positive automatic feed, requiring no other effort than to drop the vegetables in the hopper, and rotate the drum of the slicer.

Other objects of the invention will appear as the same is specifically described and then particularly claimed, invention residing in the novel construction, combination and arrangement of parts, a practical embodiment of which is shown in the accompanying drawings, in which:—

Figure 1 is a perspective view of a vegetable slicer constructed in accordance with my invention; Fig. 2 is a transverse vertical sectional view thereof through the revolving drum, and the hopper; Fig. 3 is a central longitudinal sectional view of the same; Fig. 4 is a detail sectional view of a part of the revolving drum and one of the ends thereof; Fig. 5 is a similar view showing the modified form of construction; Fig. 6 is a detail perspective view of a modified form of drum, only a part of the drum being shown; Fig. 7 is a detail perspective view of a part of the drum, showing a modified form of slicing knife.

The invention comprises a holder for a rotating drum, the said holder carrying the hopper which receives the vegetables or other articles, and having a suitable means of support.

In the embodiment of the invention shown, the holder is substantially in the shape of a longitudinal peripheral section of a cylinder, forming two sides of substantially sector-shaped cheek pieces 1 and 2 respectively, each of which has a forwardly projecting arm 3, in which arms the shaft 4, by means of which the drum is rotated, is journaled. The cheek piece or side 1 of the holder, may be formed with a depending leg 5, provided at its lower extremity with a suitable clamp 6, by means of which the device may be clamped to the edge of a table or other suitable support, and held firmly in position for use. The cheek pieces 1 and 2 overlie the drum at the ends of the latter, and merge into the hopper 7, in other words, the hopper 7 may be stated to be constructed on the peripheral section. As the inwardly projecting ends of the sides or cheap pieces of the holder extend over the periphery of the rotating drum, the sides 8 of the hopper project outwardly at right angles from a point beyond the ends of the drum, and the rear wall 9 of this hopper is so constructed as to gradually recede from the axis until it attains to nearly the height of the revolving drum, when it makes an outward turn in order to provide more mouth room to the hopper. The rear wall of the hopper therefore recedes through the major portion of its length from the axis of the revolving drum, while the end walls are in a plane perpendicular to the axis. By the reverse curve given to the inner face of the rear wall 9 of this hopper, the vegetables or other articles of food are caused to feed downwardly in the hopper into engagement with the drum, and as they are engaged by the knives or other cutting elements, are drawn downwardly into the hopper until they have been completely disintegrated.

The revolving drum may be in the form of a cylinder 10, provided with plain edged knives 11, as shown in Figs. 1, 2 and 3, with corrugated knives 12, as shown in Fig. 7, or this drum may be in the form of a grater 14, as shown in Fig. 6. Generally however, the drum is constructed with knives 11 as shown, arranged at a slight angle to the plane of the axis, and not extending to the ends of the cylinder. These knives are advantageously formed by slotting the cylinder, turning the edges of the material outwardly more or less, and sharpening the after edges thereof.

Upon the shaft 4, is mounted two cylinder heads 15, 16 respectively, the former in the form of a disk, and the latter in the form of a spider, whereby one end of the cylinder or drum is closed, and the other end is open, so as to allow the sliced vegetables or other articles to be discharged therefrom. The drum or cylinder, and the cylinder heads thereof are caused to rotate in unison by being securely bound together, and this may be accomplished by providing the cylinder head 15 with an inwardly extending annular flange 17, provided with an annular groove 18, and similarly grooving the inner face of the spider 16. The ends of the drum or cylinder 10, are received in these grooves 18, a shoulder 19 is provided on the shaft 4, and the spider 16 threaded onto said shaft so that by turning up the spider the cylinder or drum and its heads are securely bound together. The cylinder heads may, if desired be constructed as shown in Fig. 5, in which they are provided with an inwardly projecting flange 20, which is received within the ends of the drum or cylinder 10. The one end of the shaft 4 is adapted to receive a corer 21, which may be removably fastened thereto in any desired manner, while the other end of the shaft is constructed to receive a crank 21', which may also be detachably connected thereto in any desired manner.

The cylinder or drum is disposed in the holder, as more clearly observed in Fig. 3, closer to the side or cheek piece 1, than to the side or cheek piece 2, thus affording sufficient clearance at the open end of the drum or cylinder for the escape of the disintegrated vegetables or other articles.

The construction, and operation of the device will be clearly apparent from the foregoing description, taken in connection with the accompanying drawings, and it is thought that further detail description of the drawing will be unnecessary, though it is desired to call particular attention to certain advantages resulting from the specific construction.

By the particular shape of the hopper, it will be observed that the side walls thereof lie at a point opposite the ends of the cutting knives, insuring the perfect slicing of vegetables placed within the hopper, the shape of the rear wall of the hopper causing the vegetables to be fed into the hopper and drawn down by the knives until they are completely sliced, the periphery of the hopper beyond the ends of the knives lying close to the inturned portions of the sides or cheek pieces, preventing any of the sliced vegetables or other articles escaping from the holder, other than through their proper exit through the drum or cylinder.

Having thus fully described my invention what I claim as new and desire to secure by Letters Patent is:

1. A vegetable slicer comprising a holder embodying two cheek pieces having forwardly projecting arms, one of said arms having a depending supporting leg, a rotatable shaft journaled in the cheek pieces and provided with a shoulder and a screw-threaded portion, a cutting drum mounted upon said shaft and abutting against the shoulder, a spider secured to said screw-threaded portion and engaging the drum for connecting it to the shaft, and a hopper arranged at the rear of the drum, connecting the cheek pieces together, and of less width than the width of the drum.

2. A vegetable slicer comprising a holder embodying two cheek pieces having forwardly-projecting arms, one of said arms having a depending supporting leg, a rotatable shaft journaled in the cheek pieces and provided with a shoulder and a screw-threaded portion, a cutting drum mounted upon said shaft and abutting against the shoulder, a spider secured to said screw-threaded portion and engaging the drum for connecting it to the shaft, and a hopper arranged at the rear of and of less width than the drum, said hopper connecting the cheek pieces together and greatly decreasing in width and breadth downwardly, the rear wall of said hopper meeting with the periphery of the drum at a point below the axes of the latter.

3. A vegetable slicer comprising a holder embodying two cheek pieces having forwardly projecting arms, one of said arms having a depending supporting leg carrying a clamping screw, a rotatable shaft journaled in the cheek pieces and provided with a screw threaded portion, a cutting drum mounted upon the shaft, a spider secured to said screw-threaded portion and engaging one edge of the drum for connecting the latter to the shaft and a hopper arranged at the rear of the drum and connecting the cheek pieces together.

In testimony whereof I affix my signature in the presence of two witnesses.

CHARLES E. WAGNER.

Witnesses:
JOHN BURIANEK, Jr.,
B. LODER.